United States Patent [19]
Reuter

[11] Patent Number: 6,036,752
[45] Date of Patent: Mar. 14, 2000

[54] PLEATED FILTER

[75] Inventor: Robert J. Reuter, Woodbury, Minn.

[73] Assignee: 3M Innovative Properties Company, St. Paul, Minn.

[21] Appl. No.: 09/123,641

[22] Filed: Jul. 28, 1998

[51] Int. Cl.[7] .................................................. B01D 46/52
[52] U.S. Cl. .................................. 96/67; 55/497; 55/521; 55/524; 55/DIG. 39; 210/493.3; 210/493.5; 210/507
[58] Field of Search ........................... 96/17, 67; 55/497, 55/521, 524, DIG. 5, DIG. 39; 210/493.1, 493.5, 493.3, 506, 507

[56] References Cited

U.S. PATENT DOCUMENTS

| | | |
|---|---|---|
| Re. 30,782 | 10/1981 | van Turnhout . |
| 2,790,207 | 4/1957 | Steele et al. . |
| 2,968,361 | 1/1961 | Buckman .................................. 55/524 |
| 3,112,264 | 11/1963 | Bub . |
| 3,280,985 | 10/1966 | Czerwonka . |
| 3,531,920 | 10/1970 | Hart ........................................ 55/521 |
| 3,692,184 | 9/1972 | Miller, Jr. et al. ......................... 55/524 |
| 3,871,851 | 3/1975 | Neumann .................................. 55/521 |
| 4,151,095 | 4/1979 | Wright .................................. 210/493.5 |
| 4,215,682 | 8/1980 | Kubik et al. . |
| 4,363,682 | 12/1982 | Thiebault . |
| 4,478,620 | 10/1984 | Tamura ..................................... 55/524 |
| 4,512,891 | 4/1985 | Wright et al. ............................. 55/524 |
| 4,588,537 | 5/1986 | Klaase et al. . |
| 4,592,815 | 6/1986 | Nakao . |
| 4,734,195 | 3/1988 | Lhuillier et al. . |
| 4,798,850 | 1/1989 | Brown . |
| 4,904,174 | 2/1990 | Moosmayer et al. . |
| 5,045,094 | 9/1991 | Paranjpe ................................... 55/524 |
| 5,071,555 | 12/1991 | Enbom .................................. 210/493.5 |
| 5,084,178 | 1/1992 | Miller et al. ............................. 55/524 |
| 5,122,048 | 6/1992 | Deeds . |
| 5,230,455 | 7/1993 | Price ........................................ 55/521 |
| 5,230,800 | 7/1993 | Nelson . |
| 5,252,111 | 10/1993 | Spencer, et al. . |
| 5,290,447 | 3/1994 | Lippold .................................... 55/521 |
| 5,306,321 | 4/1994 | Osendorf .................................. 55/521 |
| 5,350,620 | 9/1994 | Sundet et al. . |
| 5,401,446 | 3/1995 | Tsai et al. . |
| 5,496,507 | 3/1996 | Angadjivand et al. . |
| 5,505,754 | 4/1996 | Gasser . |
| 5,512,075 | 4/1996 | Ninomiya et al. ........................ 55/521 |
| 5,512,172 | 4/1996 | Marble ..................................... 55/521 |
| 5,531,892 | 7/1996 | Duffy ....................................... 55/521 |
| 5,744,036 | 4/1998 | Choi ........................................ 55/521 |

FOREIGN PATENT DOCUMENTS

| | | |
|---|---|---|
| 0 382 330 A1 | 8/1990 | European Pat. Off. . |
| 0 723 800 A1 | 7/1996 | European Pat. Off. . |
| 43 45 121 A1 | 7/1995 | Germany . |
| WO 97/30771 | 8/1997 | WIPO . |

*Primary Examiner*—Duane S. Smith
*Attorney, Agent, or Firm*—David B. Patchett

[57] ABSTRACT

Filter assemblies are disclosed that include a pleated web in which the pleats are connected to each other to provide support for the filter media during use. The interconnected pleats preferably form an array of openings facing the upstream side of the filter assembly when subjected to fluid pressure during use. In addition, the preferred filter media also includes an array of pockets located behind each of the points at which the pleats are connected. By connecting the pleats to form arrays of openings and pockets during use, the filter assemblies provide a structure that deforms in a predetermined, acceptable manner without the need for external support structure to support the pleats.

18 Claims, 5 Drawing Sheets

PLEATED FILTER

The present invention relates to a filter assembly. More particularly, the present invention relates to a filter assembly suitable for air filtration and heating, ventilating, and air conditioning systems.

BACKGROUND

One objective of a high performance air filter is to provide maximum particle removal from an airstream while maintaining an acceptable pressure drop between the upstream and downstream sides of the filter. It is known that longer filter life is obtained where more filter media is used per frontal area of filter surface. Filter assemblies that are provided with a pleated web of filter media may include a support in addition to the filter media, such as a screen or wire mesh. By providing a filter assembly with a pleated web of filter media, the amount of filter media per frontal surface area of the filter assembly can be increased. The support is provided to maintain the shape of and reduce deformation of the pleats during use due to the fluid pressure to which the filter assemblies are subjected.

The additional support material provides a number of disadvantages. It increases the pressure drop across the filter assembly because of the additional flow resistance caused by the support material. The complexity of the filter assembly, and its cost, are also increased by the need for support material. Many of the support materials are metallic and can include sharp edges that can increase the difficulty of installing the support materials.

As a result, a need exists for a pleated filter assembly that can maintain its working shape without the need for external support structure.

SUMMARY OF THE INVENTION

The present invention provides a novel filter assembly and processes for manufacturing the filter assembly. The filter assemblies are particularly suitable for use with typical commercial or residential heating, ventilating, and air conditioning systems.

The filter assemblies of the present invention provide a pleated web in which the pleats are connected to each other to provide support for the filter media during use. The interconnected pleats preferably form an array of openings facing the upstream side of the filter assembly when subjected to fluid pressure during use. In addition, the preferred filter media also includes an array of pockets located behind each of the points at which the pleats are connected. By connecting the pleats to form arrays of openings and pockets during use, the filter assemblies provide a structure that deforms in a predetermined, acceptable manner without the need for additional reinforcing material to support the pleats.

Pleated filter assemblies according to the present invention, with their complementary arrays of openings and pockets, provide increased particulate loading capacity for a given pressure drop or, alternatively, a smaller pressure drop for the same level of particulate loading. Furthermore, the total weight of particulate matter that can be captured by a filter assembly according to the present invention is improved over standard pleated filter constructions because of the increased filter material used in the filters.

In one aspect, the present invention provides a filter assembly including a substantially rigid frame defining an opening, the frame having an upstream side and a downstream side; filter media extending across the opening, the filter media having an upstream side and a downstream side and being substantially unsupported across the opening of the frame; a plurality of pleats formed in the filter media, each pleat including a leading edge defined by a common fold line on the upstream side of the filter media and an upper panel and a lower panel, the upper and lower panels being separated by the common fold line; wherein first and second pleats in each group of four successive adjacent pleats are connected at a plurality of first connection points at spaced intervals along the first and second pleats, and further wherein the second and third pleats in the group of four successive pleats are connected to each other at second connection points at spaced intervals along the second and third pleats, the second connection points being offset along the pleats from the first connection points.

In another aspect, the present invention provides a filter assembly including a substantially rigid frame defining a generally planar opening, the frame having an upstream side and a downstream side; filter media extending across the opening, the filter media having an upstream side and a downstream side and being substantially unsupported across the opening of the frame; a plurality of pleats formed in the filter media, each pleat including a leading edge defined by a common fold line on the upstream side of the filter media and an upper panel and a lower panel, the upper and lower panels being separated by the common fold line; wherein at least the leading edges of the first and second pleats in each group of three successive adjacent pleats are connected at a plurality of first connection points at spaced intervals along the first and second pleats, and wherein at least the leading edges of the second and third pleats in the group of three successive pleats are connected to each other at second connection points at spaced intervals along the second and third pleats, the second connection points being offset along the pleats from the first connection points, and further wherein the frame has a frame depth between the upstream and downstream sides and the filter media has a pleat depth between the upstream and downstream sides, the pleat depth being greater than the frame depth.

In another aspect, the present invention provides a filter assembly including filter media having an upstream side and a downstream side; a plurality of pleats formed in the filter media, each pleat including a leading edge defined by a common fold line on the upstream side of the filter media and an upper panel and a lower panel, the upper and lower panels being separated by the common fold line; a plurality of first connection points connecting only a portion of the first and second pleats in each group of three successive adjacent pleats at spaced intervals along the first and second pleats; and a plurality of second connection points connecting only a portion of the second and third pleats in the group of three successive pleats at spaced intervals along the second and third pleats, the second connection points being offset along the pleats from the first connection points, wherein the first and second connection points form an array of diamond-shaped openings in the upstream side of the filter media and an array of pockets formed behind each of the first and second connection points.

In another aspect, the present invention provides a method of manufacturing a filter assembly by providing filter media having an upstream side and a downstream side and including a plurality of pleats, each pleat including a leading edge defined by a common fold line on the upstream side of the filter media and an upper panel and a lower panel, the upper and lower panels being separated by the common fold line; connecting first and second pleats in each group of three successive adjacent pleats at a plurality of first connection points at spaced intervals along the first and second pleats; connecting second and third pleats in the group of three successive pleats at second connection points at spaced intervals along the second and third pleats, the second connection points being offset along the pleats from the first connection points; and locating the filter media within a substantially rigid frame defining an opening, the filter media being substantially unsupported across the opening of the frame.

In another aspect, the present invention provides a method of manufacturing a filter assembly by providing filter media having an upstream side and a downstream side and including a plurality of pleats, each pleat including a leading edge defined by a common fold line on the upstream side of the filter media and an upper panel and a lower panel, the upper and lower panels being separated by the common fold line; connecting at least the leading edges of the first and second pleats in each group of three successive adjacent pleats at a plurality of first connection points at spaced intervals along the first and second pleats; connecting at least the leading edges of the second and third pleats in the group of three successive pleats at second connection points at spaced intervals along the second and third pleats, the second connection points being offset along the pleats from the first connection points; and locating the filter media within a substantially rigid frame defining a generally planar opening, the filter media being substantially unsupported across the opening of the frame, wherein the frame has a frame depth between the upstream and downstream sides and the filter media has a pleat depth between the upstream and downstream sides, and further wherein the pleat depth is greater than the frame depth.

These and other various features and advantages of the present invention will be discussed more completely below.

DETAILED DESCRIPTION OF ILLUSTRATIVE EMBODIMENTS OF THE INVENTION

The pleated filter assemblies of the present invention can be used for many applications in air filtration. Examples of these applications include heating, ventilating, and air conditioning filters for homes and commercial buildings. Such filters include high efficiency particulate air (HEPA) filters. Other applications for these filters include clean room filters, filters for filtering combustion air for machinery (e.g., automobiles, trucks, etc.), filters for electronic equipment, filters for personal respirators, filters for room air cleaners, cabin air filters for vehicles, etc.

Because of the novel interconnected pleat structure of the pleated filter assemblies according to the present invention, the need for external support structures is reduced or eliminated. By external support structures, we mean supports that are external to the filter media itself. Common examples of such external supports are wire meshes, screens, etc. As a result, for filter assemblies according to the present invention, the filter media can be substantially unsupported across an opening while maintaining the desired pleated/pocketed structures described below. By substantially unsupported, we mean that no external support structure is provided to support the filter media across the opening.

Figure 1:
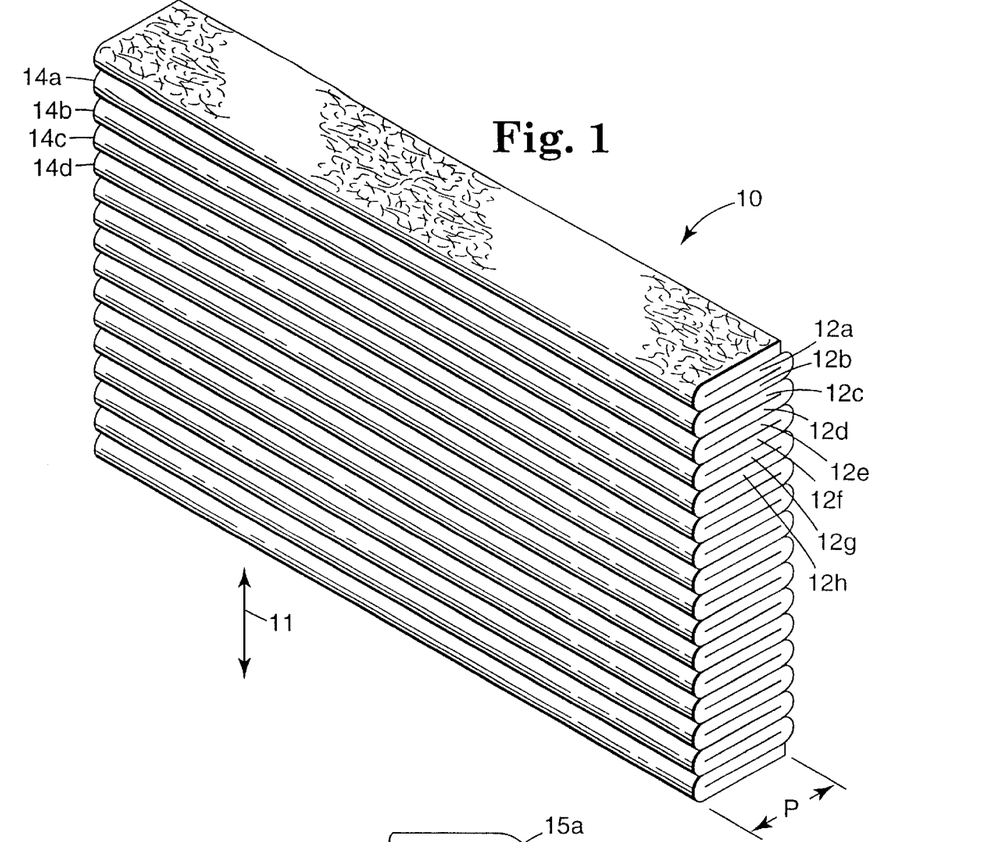
FIG. 1 is a perspective view of a pleated filter media for use in connection with the present invention.
Figure 1A:
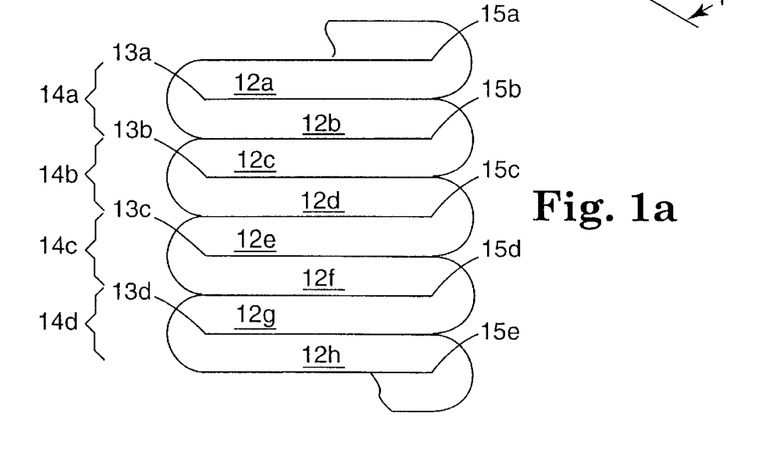
FIG. 1a is an enlarged end view of a portion of the pleated filter media of FIG. 1.

FIG. 1 is a perspective view of a pleated filter media 10 formed from a sheet of filter material and FIG. 1a is an enlarged end view of a portion of the pleated filter media 10. The filter material has been folded into panels 12a, 12b, 12c, etc. (collectively referred to as panels 12) in an accordion-style manner. In the pleated filter media 10 of FIG. 1 a series of fold lines 13a, 13b, 13c, etc. (collectively referred to as fold lines 13) are located on one side of the pleated filter media 10 while a series of fold lines 15a, 15b, etc. (collectively referred to as fold lines 15) are located on the opposite side of the pleated filter media 10.

Each pair of panels 12 connected by a common fold line 13 is defined as a pleat 14a, 14b, 14c, etc. Adjacent successive pleats 14 are connected by a fold line 15 on the opposite side of the pleated filter media 10. For example, pleat 14a includes panels 12a and 12b along with common fold line 13a, while pleat 14b includes panels 12c and 12d along with common fold line 13b. Each of the panels 12 is defined by the fold lines 13 and 15 on opposite sides of the pleated filter media 10. For example, panel 12a is defined by fold lines 13a and 15a while panel 12b is defined by fold lines 13a and 15b. This construction continues down the pleated filter media 10 (in the direction of arrow 11) such that the media has an accordion-like pattern of pleats 14 formed by panels 12 formed by fold lines 13 and 15.

As shown in FIG. 1, it is preferred, but not required, that the fold lines 13 and 15 be generally parallel to each other and that the panels 12 and pleats 14 formed between the fold lines 13 and 15 may be of a generally uniform size with a uniform depth P as shown in FIG. 1. Variations in the pattern of the fold lines 13 and 15 and resulting pleat size and shape could include pleats 14 (and panels 12) that have a depth that varies from pleat to pleat and/or along the length of the fold lines.

The sheet of material used to form the pleated filter media 10 will vary depending upon the application for which the filter assembly is constructed. For example, the media 10 may or may not be electrically charged or include electrically charged materials. The media may be provided as a woven, knitted, non-woven or laminated material suitable for filtration of fluids such as air. Some exemplary filter media are described in, e.g., U.S. Pat. Nos. Re. 30,782; 4,215,682; 4,363,682; 4,588,537; 4,592,815; 4,798,850; 4,904,174; 5,122,048; 5,230,800; 5,350,620; and 5,401,446; 5,496,507; as well as PCT Publication No. WO 97/30771.

Regardless of the material used to form that pleated filter media, it should possess sufficient tensile strength to withstand the fluid pressures placed on the filter media during use. It may be preferable that the tensile strength of the filter material used to create the pleated filter media 10 is preferably sufficient to withstand air velocities encountered in typical commercial and residential filtration operations, e.g., about 1.5 meters per second.

The pleated filter media 10 may be fabricated from a single layer sheet of material or it may be provided from a multi-layer sheet of different materials having different properties. For example, it may be desirable to combine or layer filter materials that are of different densities or thickness so that lower density material may be employed to trap large particles of unwanted contaminants while the higher density materials may be employed to trap smaller particles. Alternatively, it may be desirable to incorporate scrim material, fibers, etc. to enhance the tensile strength of the filter media.

Figure 2:
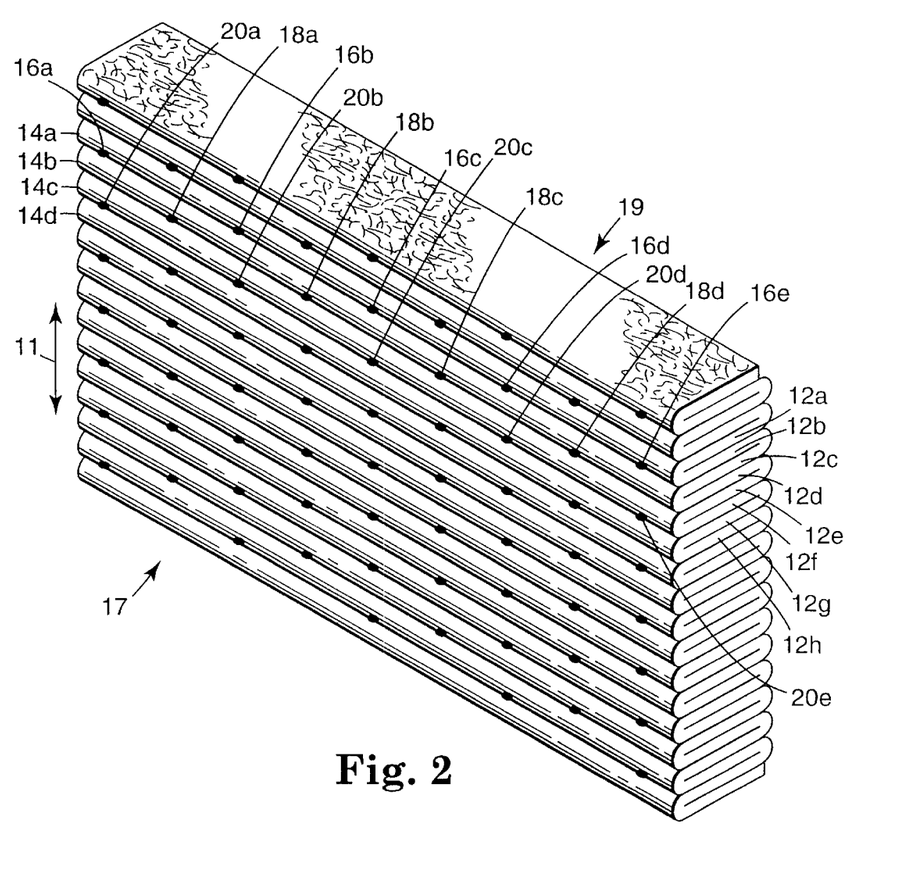
FIG. 2 is a perspective view of the filter media of FIG. 1 including connection points between pleats according to the present invention.

FIG. 2 is a perspective view of the pleated filter media 10 of FIG. 1 further including a series of interspersed connection points used to provide the structure for the filter media of the present invention. The structure of the filter media 10 will be explained below with reference to FIG. 2 and to the group of four successive adjacent pleats 14a, 14b, 14c and 14d depicted in the enlarged view of FIG. 1a. The pleats 14a–14d encompass eight successive adjacent panels 12a, 12b, 12c, 12d, 12e, 12f, 12g, and 12h and the associated group of four common fold lines 13a, 13b, 13c, and 13d on one side of the media 10. The common fold lines 13 are located on what will be referred to as the leading edge of the pleats 14 which also corresponds to the upstream side of the pleated filter media 10.

Although the discussion below will focus on the group of four adjacent pleats depicted in FIG. 1a (which are also seen in FIG. 2), it will be understood that the pleated filter media and filter assemblies of the present invention could be constructed with as few as three successive adjacent pleats or as many pleats as desired to obtain a filter having the desired size.

In the illustrated embodiment, adjacent panels 12b and 12c of the first and second pleats 14a and 14b, respectively, are linked together at a series of first connection points 16a, 16b, 16c, 16d, and 16e (collectively referred to as first connection points 16) that are located at spaced-apart intervals along the pleats 14a and 14b on the upstream side 17 of the filter media 10 which is opposite the downstream side 19 (see FIG. 2).

In one embodiment, it is preferred that the pleats 14a and 14b be linked together only at their leading edges, i.e., in the area proximate the fold formed by fold lines 13a and 13b at the upstream side 17 of the pleated filter media 10. Limiting the first connection points 16 to the leading edges of the pleats 14 may allow better use of the filter media "behind" those connection points, i.e., directly downstream from the connection points. This concept is explained in more detail below with respect to the pockets 24 formed behind each of the connection points in the preferred pleated filter media 10. (see FIGS. 3, 4 and 4A).

Alternatively, it may be helpful to connect the adjacent pleats 14a and 14b over at least a portion of the depth of the corresponding panels 12b and 12c in addition to or in place of connecting the leading edges of the pleats 14a and 14b. As used here, depth is determined between the fold lines 13 and 15 on opposite sides of the pleated filter media 10 or, alternatively, between the upstream and downstream sides 17 and 19 of the pleated filter media 10.

At each of the connection points 16 along the pleats 14a and 14b, the pleats 14a and 14b are physically linked together by any suitable technique. For example, pleats 14a and 14b may be linked at connection points 16 by use of, e.g., adhesives, resins, clips, staples, sewing, welding (using, e.g., ultrasonic energy or laser energy), etc. In one preferred embodiment, the connection points 16 are formed by ultrasonically welding the filter material.

A series of second connection points 18a, 18b, 18c, and 18d (collectively referred to as second connection points 18) are located along the second and third pleats 14b and 14c in the relevant group of pleats 14. The second connection points 18 preferably link the pleats 14b and 14c in a manner similar to the manner in which the first connection points 16 link pleats 14a and 14b as described above. It is preferred that the pleats 14b and 14c be linked together at their leading edges, i.e., at the outside of the fold formed by fold lines 13b and 13c at the upstream side 17 of the pleated filter media 10. It may also be helpful to connect the adjacent pleats 14b and 14c over at least a portion of the depth of the corresponding panels 12d and 12e in addition to or in place of connecting the leading edges of the pleats 14b and 14c.

Furthermore, the second connection points 18 are preferably offset from the first connection points 16 across the width of the pleated filter media 10, i.e., along the pleats 14a, 14b, and 14c. In other words, the second connection points 18 are not aligned along the vertical axis 11 with the first connection points 16. Axis 11 is described here as vertical for illustration purposes only because the pleats 14 are illustrated as being generally horizontal and parallel to each other. More generally, axis 11 is defined as being generally perpendicular to the pleats 14 and associated fold lines 13 and 15.

It is preferred, but not required, that the second connection points 18 be located at approximately the midpoint between each pair of first connection points 16. For example, second connection point 18b would preferably, but not necessarily, be located midway between first connection points 16b and 16c across the width of the pleated filter media 10.

Moving farther down the pleated filter media 10 to the third and fourth pleats 14c and 14d, a series of third connection points 20a, 20b, 20c, 20d, and 20e (collectively referred to as third connection points 20) are located along the common pleats 14c and 14d. The third connection points 20 preferably link pleat 14c with pleat 14d in a manner similar to the manner in which the first connection points 16 link pleats 14a and 14b as described above. It is preferred that the pleats 14c and 14d be linked together at their leading edges, i.e., at the outside of the fold formed by fold lines 13c and 13d at the upstream side 17 of the pleated filter media 10. It may also be helpful to connect the adjacent pleats 14c and 14d over at least a portion of the depth of the corresponding panels 12f and 12g in addition to or in place of connecting the leading edges of the pleats 14c and 14d.

Furthermore, the third connection points 20 are preferably offset from the second connection points 18 across the width of the pleated filter media 10. In other words, the third connection points 20 are not aligned along the vertical axis 11 with the second connection points 18. It is preferred, but not required, that the third connection points 20 be located at approximately the midpoint between each pair of second connection points 18. For example, third connection point 20b would preferably, but not necessarily, be located midway between second connection points 18b and 18c across the width of the pleated filter media 10.

In addition to the positioning of the third connection points 20 relative the second connection points 18, it is also preferred, but not required, that the third connection points 20 located along pleats 14c and 14d be generally aligned along the vertical axis 11 with the first connection points 16 located along pleats 14a and 14b.

The connection points 16, 18 and 20 may link the pleats 14 and associated panels 12 at a point, i.e., the link may have a minimal depth as measured between fold lines 13 and 15. Alternatively, the link at each of the connection points 16, 18 and 20 may be provided in the form of a line extending partially or completely between the fold lines 13 and 15, or the connection points 16, 18, and 20 may be advantageously provided in one or more geometric configurations such as a V-shape, S-shape, circle, triangle, etc.

Furthermore, although the spacing between the first, second, and third connection points 16, 18, and 20 is shown as being generally uniform, it would be understood that the spacing between connection points within one or more of the groups could be non-uniform, varying in either a random or predetermined manner.

The methods and equipment used to form the pleats 14 and connect them as discussed above are common to those used in many different applications (e.g., quilting equipment, folding equipment, etc.) and, as a result, will not be further described here.

Figure 3:
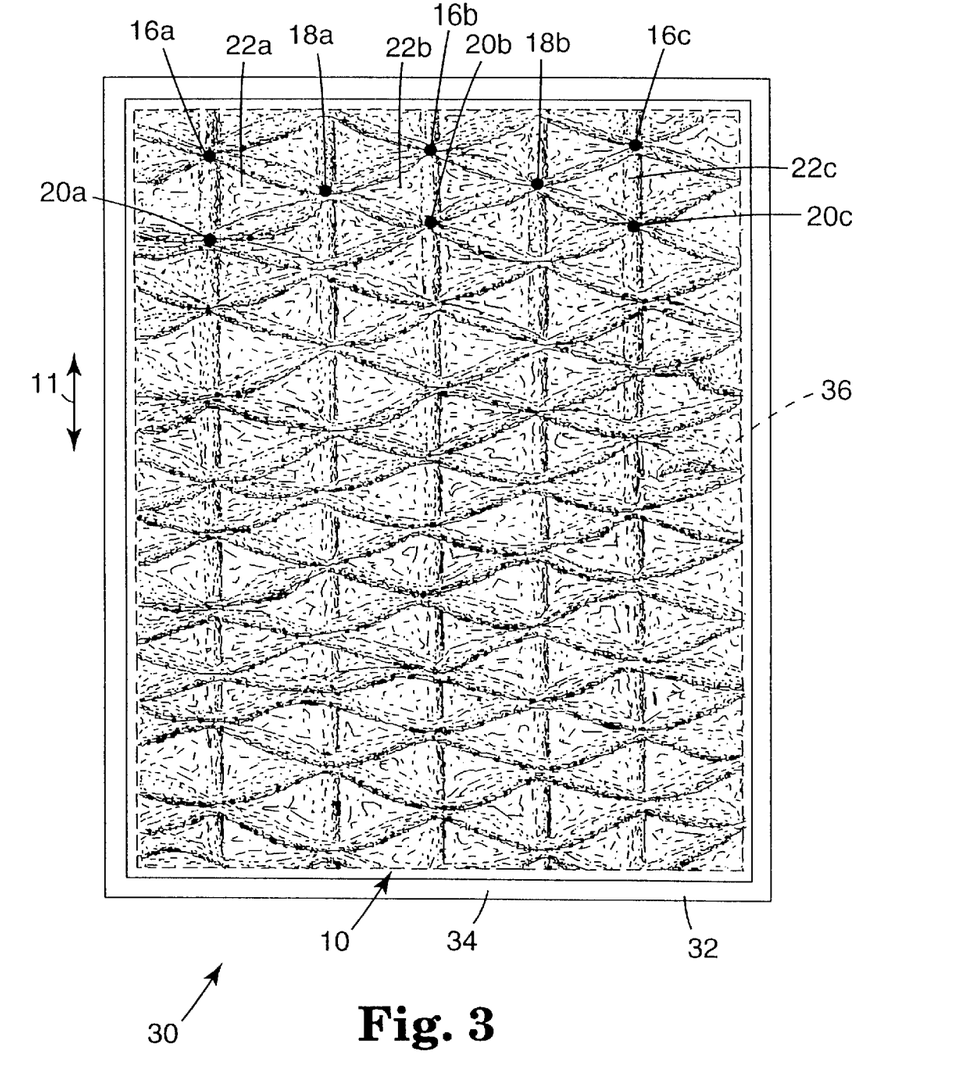
FIG. 3 is a plan view of the upstream side of the filter media of FIGS. 1 and 2 after expansion and connection to a frame.

FIG. 3 is a perspective view of one filter assembly 30 according to the present invention. The filter assembly 30 includes the pleated filter media 10 of FIGS. 1 and 2 located within a frame 32. The frame 32 is preferably substantially rigid and defines a generally planar center opening in which the pleated filter media 10 is located. By substantially rigid, it is meant that the frame 32 provides structural support to the media 10 located within its center opening.

Although the illustrated embodiment includes a substantially rigid frame, the filter assemblies of the present invention may be provided without a frame and may instead be supported by clamps or equivalent structures that suspend the filter media in a fluid path. Alternatively, the frame 32 may be collapsible such that it is at least partially assembled at the point of use.

Figure 5:
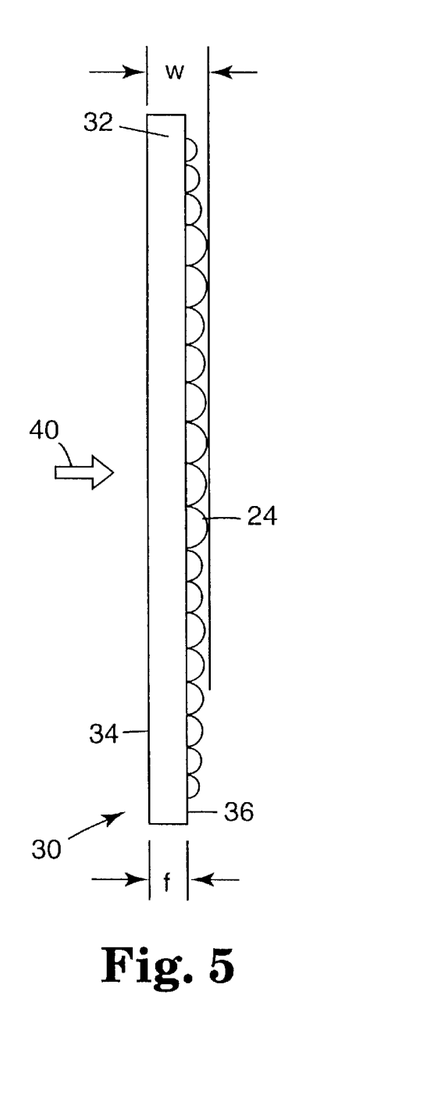
FIG. 5 is a side view of the filter assembly of FIGS. 3 and 4 depicting the change in working depth of the filter assembly when subjected to fluid pressure.

The illustrated frame 32 preferably has an upstream side 34 and a downstream side 36 and, furthermore, the frame 32 preferably has a frame depth (f) as best seen in FIG. 5.

Although the filter assembly 30 is depicted as being rectangular, it is to be understood that the frame 32 and pleated filter media 10 located therein may be provided in any known shape including, but not limited to, square, trapezoidal, circular, elliptical, etc.

One primary function of the frame 32 is to maintain the filter media 10 under tension along the vertical axis 11 such that the pleats 14 are separated from each other. The result of that separation and the interconnected structure of the pleated filter media 10 at the first, second and third connection points 16/18/20 as described above is that an array of openings 22 facing the upstream side of the filter assembly 30 is formed. Each of the openings 22 is preferably generally diamond-shaped and is defined by the connection points 16, 18, and 20 as described with respect to the pleated filter media 10 of FIG. 2. For example, opening 22b is defined by connection points 16b, 18a, 18b and 20b and the pleated filter media 10 includes an array of these openings 22 as illustrated in FIG. 3.

The openings 22 are formed by drawing the pleated filter media 10 in tension along axis 11, which increases the distance between the first and third connection points 16 and 20 as compared to the unstretched filter media 10 in FIG. 2. The filter material forming panels 12d and 12e of pleats 14b and 14c between connection points 18d and 18e will then generally be separated by that tension.

Figure 4:
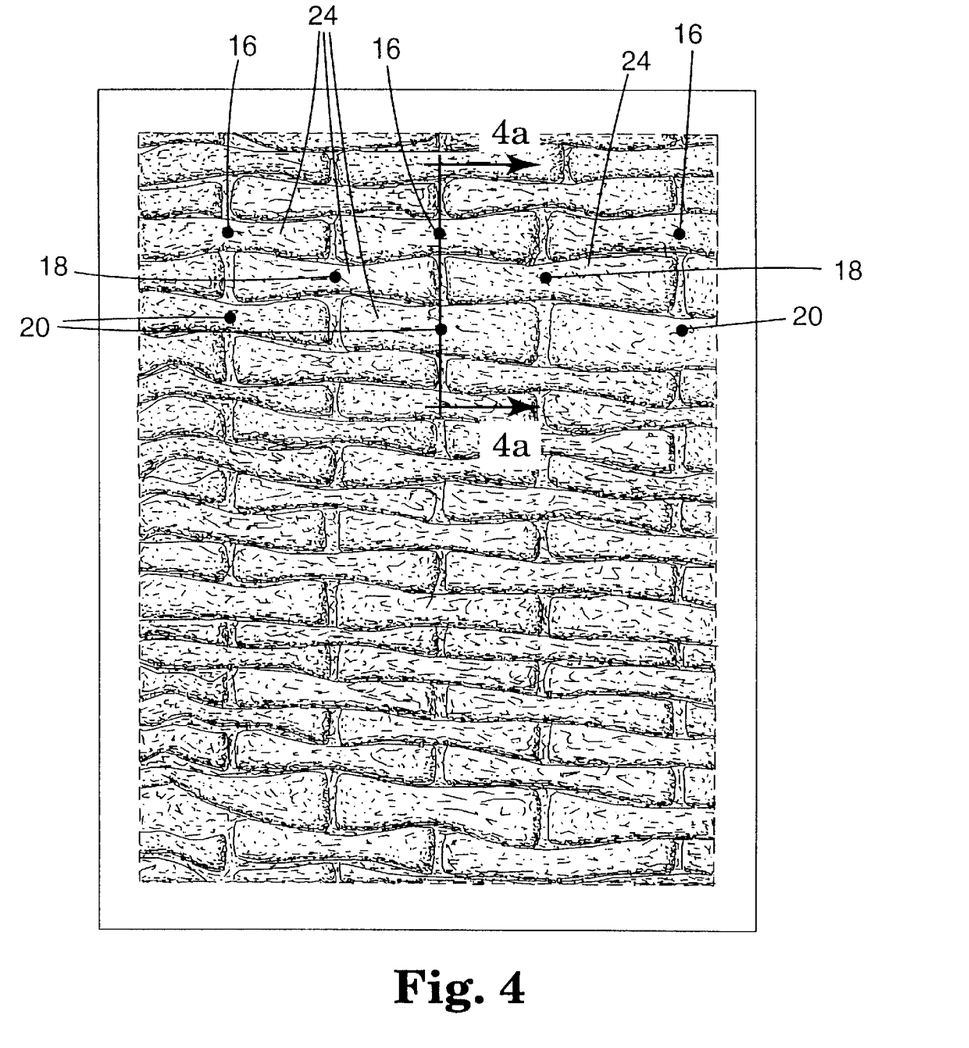
FIG. 4 is a plan view of the downstream side of the filter media of FIG. 3.

In addition to the openings 22 facing the upstream side of the filter media, the first/second/third connection points 16/18/20 also form an array of pockets 24 in the pleated filter media 10. The pockets 24 are best seen in FIG. 4, a view of the rear of the filter media 10. Each of the pockets 24 is located behind one of the first, second or third connection points 16/18/20. The location of those connection points is indicated in the view of FIG. 4.

Figure 4A:
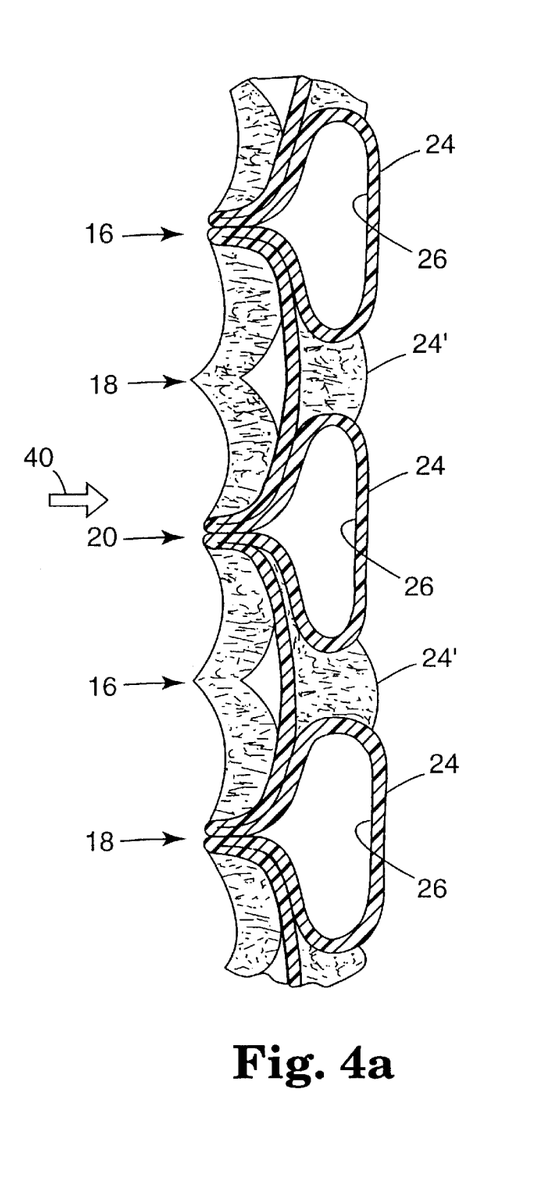
FIG. 4A is a partial enlarged cross-sectional view of the pleated filter media in a frame as seen in FIG. 4, taken along line 4A—4A in FIG. 4.

The pockets 24 are also seen in FIG. 4A, an enlarged partial cross-sectional view of the pleated filter media 10 taken along line 4A—4A in FIG. 4. The cross-sectional line 4A—4A extends through first and third connection points 16 and 20, with the second connection points 18 being seen in the background. The pockets 24 are intersected by the cross-sectional line 4A—4A and the pockets 24' are formed behind the connection pints 18 seen in the background of FIG. 4A.

The pockets 24 do not open directly to flow 40 from the front of the media 10. They do, however, operate on the airflow 40 after it has been diverted by the openings 22 formed between the connection points 16/18/20. The pockets 24 are formed behind those connection points 16/18/20 in which only a portion of the pleats connected by those connection points are bonded together. In other words, if the bond at the connection point extends over the length of the pleats being bonded, then no pocket can be formed. Because, however, the preferred filters include connection points in which the depth of the bond is less than the pleat depth, there is some free surface area 26 not forming a part of the connection points 16/18/20 and that free surface area 26 forms the pockets 24 and can be used to trap particulate matter in the same manner as the media extending across the openings 22. As a result, substantially all of the filter media not directly forming a part of the connection points 16/18/20 is available for airflow and can trap particulate matter. That high percentage of working area contributes to the ability of the pleated filter media 10 to offer reduced pressure drop in combination with high loading capacity.

Because of the novel interconnection scheme between the pleats of the pleated filter media 10, the need for a reinforcing structure or material is substantially reduced or eliminated, particularly for panel filters. The pleating and connection points provide a framework that is inherent within the structure of the filter media and does not require any external reinforcing structure or support to maintain the structure of the filter media across the center opening of the frame 32.

Spacing of the first and second connection points 16/18, as well as the depth of the panels 12 forming the pleats 14 can be varied to provide different structures for the pleated filter media. The intervals at which the first and second connection points 16/18 are spaced will typically be based on a number of factors including, e.g., the overall size of the filter assembly 30, the depth of the panels 12, the filter media, the expected air flow volume and speed, etc. For a typical pleated panel filter for use in, e.g., residential forced air heating/cooling systems, the first connection points 16 may preferably be spaced at intervals of, e.g., about 4 inches (100 millimeters), about 6 inches (150 millimeters), 8 inches (200 millimeters). It is preferred, but not required, that the second connection points 18 be spaced at the same intervals as the first connection points 16. It is also preferred, but not required, that each of the second connection points 18 be located about midway between the first connection points 16 on either side.

The depth of the pleats 14 can also vary based on a variety of factors. One advantage of providing pleated filter media 10 with interconnected pleats 14 as in the present invention in which no external reinforcing supports or structure are required is that the pleat depth can be greater that the frame depth (f) (see FIG. 5). For example, in a filter assembly 30 in which the frame depth is about 1 inch (25 millimeters), the pleated filter media 10 could be provided with pleats 14 that have a depth of more than 1 inch (25 millimeters). If the same frame was used in connection with external support structure, the pleats are limited to the depth of the frame. In the filter assemblies according to the present invention, however, the pleat depth can be larger that the frame depth. In some embodiments it may be preferred that the ratio of the pleat depth to the frame depth be about 1.5:1 or greater, even more preferably about 2:1 or greater.

FIG. 5 depicts the filter assembly 30 of FIG. 3 along a side view to illustrate operation of the filter assembly 30. The frame 32 is seen in FIG. 4 along with the frame depth (f) defined by the upstream side 34 and downstream side 36 of the frame 32. A fluid medium 40 is depicted as moving towards the upstream side 34 of the frame 32. As a result of the fluid pressure from fluid stream 40, the filter media 10 billows or deforms somewhat from its location within the confines of the frame 32. The pockets 24 billow open to a working depth (w) for the filter assembly 30 that is preferably greater than the frame depth (f). It may be preferred that the ratio of the working depth of the pockets 24 to the frame depth be about 1.25:1 or greater. It may be even more preferred that the ratio of the working depth of the pockets 24 to the frame depth be about 1.5:1 or greater.

Such billowing or deformation of the filter media is, in many instances, undesirable because of the deformation that can be caused to the corresponding support structure used to maintain the filter media in its desired shape. Such deformation of the corresponding support structure can be permanent and result in difficulty in removing the filter assembly 30 from its location, typically a slot sized based on the frame depth f within the heating, ventilating, and air conditioning equipment.

In contrast, the filter assembly 30 according to the present invention can be easily removed even after deformation during use because the filter media 10 is not rigid and will easily deform back within the frame width for removal from a filter slot in its respective equipment.

In addition to being easier to manufacture and less expensive than filter assemblies incorporating external supports, the pleated filter assemblies of the invention possess improved pressure drop characteristics and particulate loading capacities. The pressure drop characteristics and particulate loading capacities of pleated filter assemblies according to the present invention are improved, at least in part, by the increased amount of filter material provided per unit of frontal surface area of the filter assembly 30.

The patents, patent documents, and publications cited herein are incorporated by reference in their entirety, as if each were individually incorporated by reference. Various modifications and alterations of this invention will become apparent to those skilled in the art without departing from the scope of this invention. Accordingly, it is to be understood that this invention is not to be limited to the illustrative embodiments set forth herein, but is to be controlled by the limitations set forth in the following claims and any equivalents thereof.

What is claimed is:

1. A filter assembly comprising:
    a substantially rigid frame defining an opening, the frame having an upstream side and a downstream side;
    filter media extending across the opening, the filter media having an upstream side and a downstream side; and
    a plurality of pleats formed in the filter media, each pleat including a leading edge defined by a common fold line on the upstream side of the filter media and an upper panel and a lower panel, the upper and lower panels being separated by the common fold line;
    wherein first and second pleats in each group of four successive adjacent pleats are connected at a plurality of first connection points at spaced intervals along the first and second pleats,
    and further wherein the second and third pleats in the group of four successive pleats are connected to each other at second connection points at spaced intervals along the second and third pleats, the second connection points being offset along the pleats from the first connection points.

2. A filter assembly according to claim 1, wherein the filter media is substantially unsupported across the opening of the frame.

3. A filter assembly according to claim 1, wherein the first connection points connect at least the leading edges of the first and second pleats and further wherein the second connection points connect at least the leading edges of the second and third pleats.

4. A filter assembly according to claim 1, wherein the lower panel of the first pleat is connected to the upper panel of the second pleat and further wherein the lower panel of the second pleat is connected to the upper panel of the third pleat.

5. A filter assembly according to claim 1, wherein the filter media comprises an array of major pockets opening towards the upstream side of the filter media, each of the major pockets being defined by the first, second and third connection points.

6. A filter assembly according to claim 1, wherein the frame has a frame depth between the upstream and downstream sides and the filter media has a pleat depth between the upstream and downstream sides, and further wherein the pleat depth is greater than the frame depth.

7. A filter assembly according to claim 6, wherein the ratio of the pleat depth to the frame depth is about 1.5:1 or greater.

8. A filter assembly according to claim 1, wherein the fold lines are generally parallel to each other.

9. A filter assembly according to claim 8, wherein each of the plurality of pleats has a generally uniform depth transverse to the fold lines defining the pleats.

10. A filter assembly according to claim 1, wherein the opening defined by the frame is generally planar.

11. A filter assembly according to claim 1, wherein the filter media comprises electrically-charged fibers.

12. A filter assembly comprising:
    a substantially rigid frame defining a generally planar opening, the frame having an upstream side and a downstream side;
    filter media extending across the opening, the filter media having an upstream side and a downstream side and being substantially unsupported across the opening of the frame; and
    a plurality of pleats formed in the filter media, each pleat including a leading edge defined by a common fold line on the upstream side of the filter media and an upper panel and a lower panel, the upper and lower panels being separated by the common fold line;
    wherein at least the leading edges of the first and second pleats in each group of three successive adjacent pleats are connected at a plurality of first connection points at spaced intervals along the first and second pleats, and wherein at least the leading edges of the second and third pleats in the group of three successive pleats are connected to each other at second connection points at spaced intervals along the second and third pleats, the second connection points being offset along the pleats from the first connection points, and further wherein the frame has a frame depth between the upstream and downstream sides and the filter media has a pleat depth between the upstream and downstream sides, the pleat depth being greater than the frame depth.

13. A filter assembly comprising:

filter media having an upstream side and a downstream side;

a plurality of pleats formed in the filter media, each pleat including a leading edge defined by a common fold line on the upstream side of the filter media and an upper panel and a lower panel, the upper and lower panels being separated by the common fold line;

a plurality of first connection points connecting only a portion of the first and second pleats in each group of three successive adjacent pleats at spaced intervals along the first and second pleats; and a plurality of second connection points connecting only a portion of the second and third pleats in the group of three successive pleats at spaced intervals along the second and third pleats, the second connection points being offset along the pleats from the first connection points, wherein the first and second connection points form an array of diamond-shaped openings in the upstream side of the filter media; and an array of pockets formed behind each of the first and second connection points.

14. A filter assembly according to claim 12, wherein the filter media comprises electrically-charged fibers.

15. A filter assembly according to claim 12, further comprising a substantially rigid frame defining an opening, wherein the filter media is located within the opening and is substantially unsupported across the opening.

16. A filter assembly according to claim 15, wherein the frame has a frame depth between the upstream and downstream sides and the pockets have a working depth between the upstream and downstream sides when subjected to fluid pressure, and further wherein the working depth of the pockets is greater than the frame depth.

17. A filter assembly according to claim 16, wherein the ratio of the working depth of the pockets to the frame depth is about 1.25:1 or greater.

18. A filter assembly according to claim 15, wherein the opening defined by the frame is generally planar.

* * * * *